United States Patent [19]

Horn

[11] Patent Number: 5,552,782
[45] Date of Patent: Sep. 3, 1996

[54] SINGLE-HAND MOUNTED AND OPERATED KEYBOARD

[76] Inventor: Martin E. Horn, 3657 - 55th SW., Seattle, Wash. 98116

[21] Appl. No.: 334,869

[22] Filed: Nov. 4, 1994

[51] Int. Cl.$^6$ .................................................. H03K 17/94
[52] U.S. Cl. ................................ 341/22; 341/20; 341/21; 400/477
[58] Field of Search ................................ 341/20, 21, 22; 345/168; 400/477, 472, 479, 485, 87

[56] References Cited

U.S. PATENT DOCUMENTS

| 919,432 | 4/1909 | Horstmann | 400/479 |
|---|---|---|---|
| 2,532,228 | 11/1950 | Hesh | 400/485 |
| 3,022,878 | 2/1962 | Seibal et al. | 341/20 |
| 4,265,557 | 5/1981 | Runge | 400/479 |
| 4,360,892 | 11/1982 | Endfield | 364/900 |
| 4,449,839 | 5/1984 | Bleuer | 400/485 |
| 4,769,516 | 9/1988 | Allen | 200/5 R |
| 4,791,408 | 12/1988 | Heusinkveld | 340/365 R |
| 4,849,732 | 7/1989 | Dolenc | 341/20 |
| 4,905,001 | 2/1990 | Penner | 341/21 |
| 4,913,573 | 4/1990 | Retter | 400/489 |
| 4,971,465 | 11/1990 | Hashimoto | 400/485 |
| 5,006,001 | 4/1991 | Vulcano | 400/486 |
| 5,059,048 | 10/1991 | Sirkin | 400/486 |
| 5,087,910 | 2/1992 | Guyot-Sionnest | 340/711 |
| 5,137,384 | 8/1992 | Spencer et al. | 400/489 |
| 5,267,181 | 11/1993 | George | 364/709.12 |

OTHER PUBLICATIONS

Postcard, Kinesis Corporation, 915 118th Ave. S.E, Bellevue, WA 98005.

*Primary Examiner*—Brent A. Swarthout
*Assistant Examiner*—Ashok Mannara
*Attorney, Agent, or Firm*—H. Albert Richardson

[57] ABSTRACT

A hand mounted keyboard, having a pair of opposed keypads for receiving the fingers of the mounting hand between, the opposed keypads operable by opposed movements of those fingers. The keyboard also has a thumb operated keypad mounted on the exterior of the keyboard. The characters and functions are grouped into generally task related modes or lanes. The lanes are divided into blocks, each block having two rows of data, each of the rows corresponding to one of the opposed keypads. The lanes are chosen by activating a first key with the thumb, and a second key with the finger. The thumb operated key is activated to chose a relationship for mapping between blocks of data in each lane and the finger operated keys. The mapping relationships assign characters and functions by row and column to opposed keypads and fingers respectively.

15 Claims, 4 Drawing Sheets

SINGLE-HAND MOUNTED AND OPERATED KEYBOARD

BACKGROUND OF THE INVENTION

1. Field of the Invention

The present invention relates to the field of keyboard devices. More particularly, the invention pertains to keying devices to be mounted on and operated by, a single hand.

2. Description of the Prior Art

There are numerous references to keyboards in the art. Standard dual hand operated keyboards have been known for a long time. More recent references disclose keyboards intended for single handed operation. Single-hand operated keyboards are generally categorized into two types, single keystroke keyboards and chording keyboards. Single stroke keyboards, with the exception of upper case characters, generally rely on a single keystroke to fully define the output character, control or function. In contrast, chording keyboards rely on the simultaneous activation of two or more keys to define the output character, control or function.

Single-handed, single keystroke keyboards have a variety of methods for permitting such a keyboard to be relatively full functioned, that is, to provide all the same characters, computer associated controls, and word processing functions that are available on a standard two hand operated keyboard. One method of providing full functionality is to provide a sufficiently large number of keys to permit a one-to-one mapping of the keys to the characters, controls, and functions. The problem with this method is that the keyboard must be relatively large to accommodate the large number of keys required, and as a result the keyboard also becomes unwieldy.

A second method is to use a relatively small number of keys, each key being capable of sensing different directions of movement and producing output in response to the movements.

A third method of providing a single-handed, single keystroke keyboard with full functionality is to provide for "on the fly", user controlled, remapping of the keypad. Remapping allows the user to reconfigure a keypad so that each key takes on a different character, control or function dependent on the mode or lane chosen. In this way, a keypad having a small number of keys can be assigned a full complement of characters, controls and functions. In such a system, the modes or lanes are usually defined so as to group associated functions, i.e. for a single task, together, so the need to switch between the modes or lanes is reduced.

It is at this point that the difference between true single keystroke and true chording keyboards becomes blurred. Even simple, single keystroke typewriters provide a shift function which requires activation of two keys simultaneously. Alternatively, many of these typewriters also provide a CAP LOCK, which essentially places the keyboard in an upper case mode, a single keystroke entry resulting in upper case characters.

Most single-hand operated, chording keyboards, rely on the large number of chords that may be formed using combinations of the five fingers of the user's hand to provide a fully functional keyboard. Some of these keyboards additionally provide for shift and CAP LOCK operations. The large number of key combination, or chords, makes operation of the keyboard difficult to learn, requiring the operator to memorize by rote well over a hundred key combinations.

A few chording keyboards make provision for separate operating modes, i.e.. numerical/punctuation or word processing. To some degree, this alleviates the problem associated with rote memorization. In most cases, the mode switching is accomplished using a dedicated, thumb activated key, although in one case, switching is accomplished by depressing all of the finger operated keys simultaneously.

A single-hand carried and operated chording keyboard is shown in U.S. Pat. No. 5,267,181 to George. The George keyboard has both a finger and a thumb operated keypad. In George, the user grasps the pistol grip handle, the fingers wrapping around the front for activating the finger keypad, and the thumb extending up, over the top edge for activating the thumb keypad. The keys of the thumb keypad are used to shift between various keypad modes. The finger keypad allows for multiple fingers and has multiple keys per finger. The finger keypad waits until all keys are released to establish the chord. It does this by forming the chord from all the keys that were activated just before all the keys are released, and interprets this, in light of the mode, to determine what should be the appropriate output.

Other chording keyboards are disclosed in U.S. patents: U.S. Pat. No. 4,360,892 to Enfield for a Portable Word-Processor; U.S. Pat No. 4,791,408 to Heusinkveld for a Keyboard for One-Hand Operation; U.S. Pat. No. 5,087,910 to Guyot-Sionnest for an Electronic Keyboard For One-Hand Operation; U.S. Pat No. 4,971,465 to Hashimoto for a Keyboard For Use in An Information Processing Device.

Relatively few references address alternatives to the standard downward pressing finger movements generally used for activating the keys of a keyboard.

For example, U.S. Pat. No. 5,137,384 to Spencer et al. for an Ergonomic-Interface Keyboard System shows a multiple keypad system, a keypad being provided for each hand. The keypads are oriented vertically, such that the user rotates her wrists 90 degrees axially from the usual operating position for a standard, horizontal, keyboard. The keys are activated in the usual manner, through downward movements of the various fingers, the plane of operation being vertical instead of usual horizontal operating plane. U.S. Pat. No. 4,769,516 to Allen for a Finger Operated Switching apparatus discloses a multi-directional, fingertip operated key. Each key has a multi-faceted surface which the user may engage by moving her fingertip in either: i) a downward pressing motion; ii) an extending away from the palm motion; or iii) a flexing inward, toward the palm motion. The different movements of a key result in the activation of different switches, which provides for several different outputs from any single key.

Likewise, U.S. Pat. No. 4,849,732 to Dolnec discloses multi-directional, fingertip operated keys for use on a single keystroke keyboard. In this case the key is capable of moving back and front as well as side to side, in addition to being depressed. This keyboard has few modes to choose from, relying rather on upwards of eight keys per finger to permit full functionality. U.S. Pat. No. 4,265,557 to Runge shows the use of a variety of finger movements in addition to the usual downward pressing motion, intended to increase typing speed while decreasing mistakes. In Runge, the keys of a standard QWERTY type device are bent over, to surround the fingers, the fingers remaining on the home keys. This would allow, for example, a letter that is usually in the fourth row to be typed by simply lifting the finger that would normally be used to reach up to and then press down on that letter. This modified QWERTY keyboard, like all QWERTY keyboards, requires two hands to operate. With the exception of upper case, such keyboards generally rely on a single keystroke to define the output. In addition to Runge, Allen and Dolnec, discussed above, another single keystroke keyboard is disclosed in Retter, U.S. Pat. No. 4,913,573 for an Alpha-Numeric keyboard. Retter teaches away from Runge, suggesting that devices which lock the fingers into place, such as that disclosed in Runge, should be avoided.

The ability to remap a keyboard has been available in many keyboards in varying degrees. The simplest example is the shift or CAP LOCK key as shown in U.S. Pat. Nos. 4,265,557 to Runge, and 4,769,516 to Allen. This allows the normally lower case keys to be used to output upper case characters.

A more advanced version of mapping is disclosed in U.S. Pat. No. 5,006,001 to Vulcano for a Keyboard With One Hand Character Key Array And One Hand Mapping Array. In Vulcano, a first keypad is provided for entering data, the keypad being of an appropriate size and shape as to be operable by a single hand. A second keypad is provided for remapping the first keypad. This second keypad is also of an appropriate size and shape as to be operable by the user's other hand. The mapping allows the data entry keypad to be configured with various groups of functionally alike keys. Either an inordinate number of mappings must exist or the data keypad must be relatively large to accommodate, for example, all the characters for standard text entry operation. Other examples of remapping appear in U.S. Pat. Nos. 4,791,408 to Heusinkveld and 5,059, 048 to Sirkin. In Heusinkveld, the keypad may be reconfigured from alpha to numeric/punctuation mode. In Sirkin, in addition to an alpha mode and a numeric mode, a word processing mode exists.

While single-hand operated keyboards have existed for sometime, few of these keyboards have achieved an intuitive mapping scheme between the keys and the desired outputs. Most of these keyboards have relied solely on the large number of combinations provided by a chording scheme to reduce the total number of keys on the keyboard to make one handed operation feasible. Those single-hand operated keyboards that do permit single keystroke entry have, for the most part, included so many keys as to become unwieldy, or used mapping schemes that required rote memorization of several entire keypads. The same problems have plagued keyboards which rely on a large variety of finger movements to reduce the total number of keys on the keyboard. Finally, only a couple of the disclosed keyboards provide for being carried and operated using a single hand.

A primary object of the present invention is to provide a full function keyboard that may be carried on the user's hand, and operated by the fingers and thumb of that same hand, from any position in which the hand is held. The invention relies on a unique arrangement of keypads, along with an intuitive mapping scheme. The arrangement of the keypads permits the simplification of the mapping scheme. An additional benefit of the unique keypad arrangement is its dissimilarity to current keyboard design, thereby facilitating the process of transferring from conventional QWERTY key placement to the new key placement and operation. The mapping scheme is designed to be simple to understand, making it easy to remember and use. The keypad arrangement and mapping scheme provides for a reduced number of keys, and finger movements, without unduly requiring rote memorization.

Another object of the invention is to provide a light weight, easily transportable keyboard, which is carried on the user's hand and allows the user to keep the other hand free. Additionally, the shape of the keyboard housing, the fact that it is carried on the hand allowing it to be operated from any position, and the particular arrangement of the keypads all contribute to reducing and possibly eliminating the occurrence of repetitive stress injuries in the keyboard user. A final object of the invention is to provide a keyboard that may be used equally well on both the right and left hands.

SUMMARY OF THE INVENTION

The present invention generally relates to keyboard devices. In particular, it is related to single-hand mounted and operated keyboards.

This invention can be broadly summarized as a keyboard apparatus mountable on a hand of a user and including a first plurality of keys in vertically opposed and longitudinally spaced relation from a second plurality of keys, whereby the keys of the first and the second pluralities are operable by respective upward and downward movements of the fingers of the hand. The keyboard apparatus may additionally be provided with a third plurality of keys operable by movements of the thumb. The keys of the first and second pluralities may be elongated or mounted slidably within the apparatus to permit operation by the fingers of either hand of the user. A fourth plurality of keys, for operation by the thumb, may be included in the keyboard apparatus to facilitate operation of the keyboard by either hand of the user.

This invention can also be summarized as a method of keying with the fingers and thumb of a single hand, on a keyboard having a first set of finger operated keys and a second set of finger operated keys in opposed spaced relation from the first set, and at least one set of thumb operated keys. The keying output comes from a dataset of characters and functions arranged into lanes of task related outputs. The respective lanes are divided into blocks, the blocks made up of two rows apiece, each row corresponding to one of the finger operated keypads. The keying method includes the steps of activating the thumb operated keys to select the desired block and simultaneously activating one of the finger operated keys for choosing the desired lane of output; and then activating the thumb operated keys to select the desired block and simultaneously activating one of the finger operated keys for selecting the desired output.

The user is able to move between the lanes of related output characters, controls and functions by moving into similarly located block in each lane and activating a similar set of the finger operated buttons within those blocks. Blocks can be switched by activation of the thumb keys. Once a lane has been entered and a block selected each finger key has a defined character or function mapped to it. That function remains set until a new block is selected or the lane is changed.

This intuitive mapping scheme, makes the relationship between keys and output easy to understand and remember. Unlike previous efforts the mode or lane is chosen with a finger key. The characters and functions in that mode are then divided into small, easy to remember blocks. The characters within the blocks are likewise arranged in an intuitive fashion, the outputs corresponding to individual fingers and the rows corresponding to the opposed keypads so as to resemble the layout of those finger operated keypads. This can be accomplished because, unlike in all previous attempts, a finger is used to first select the lane, leaving the thumb free to select the block, and also because the finger operated keypads are arranged in opposition to one another.

DESCRIPTION OF THE PREFERRED EMBODIMENTS

Figure 1:
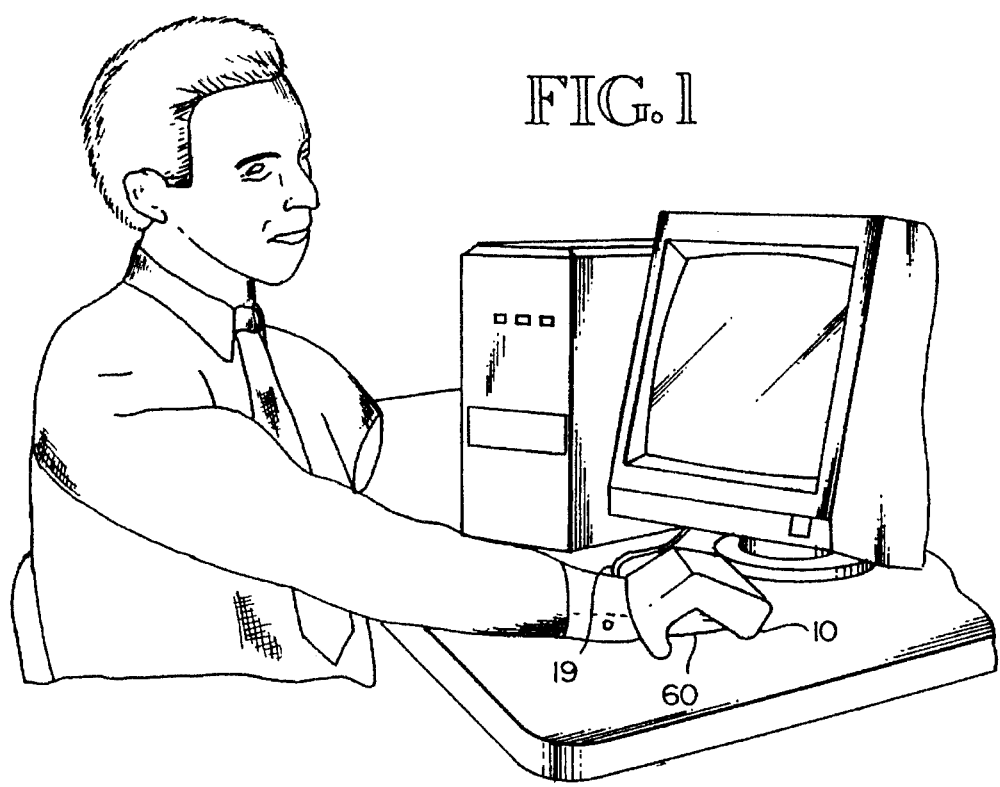
Figure 1 shows a first preferred embodiment of the keyboard apparatus in one configuration as used with related computer equipment by a user.
Figure 2:
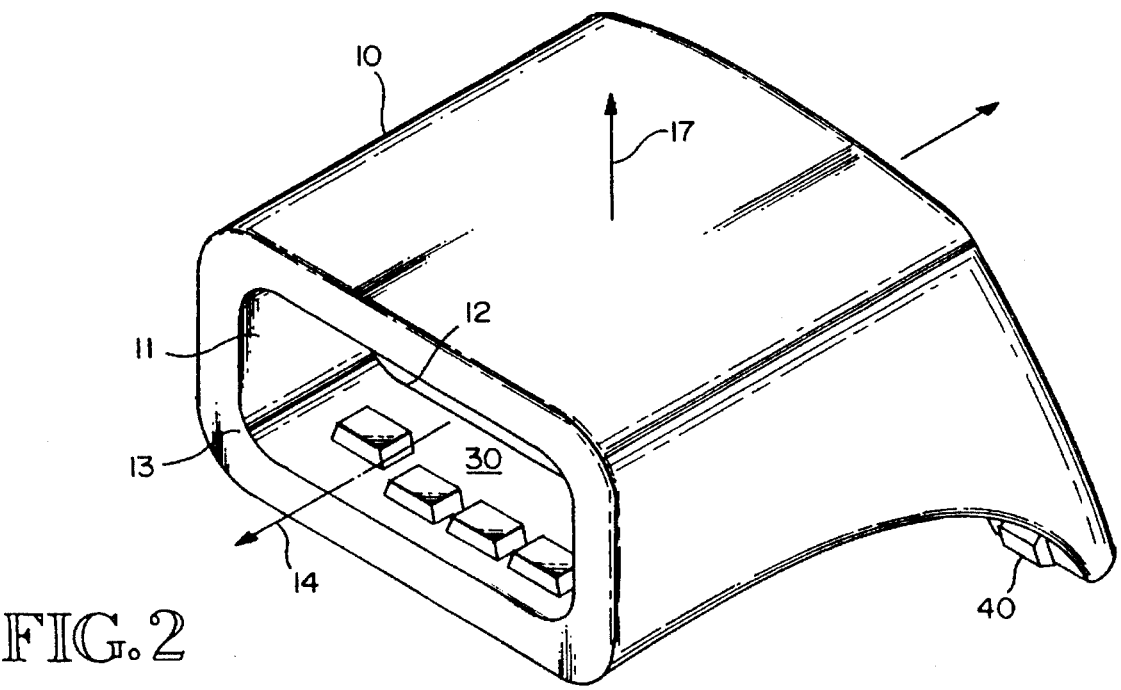
FIG. 2 shows an orthogonal view of the embodiment of FIG. 1.

With general reference to the FIGS. 1–4, a partial glove shaped housing 10 is formed of any suitable material, injection molded ABS plastic being preferred The housing 10 has a cavity or passageway 11 defined therein. A first end of the passageway 11 defines a first opening 12 in a portion of the housing 10 for receiving part of the user's hand. In the preferred embodiment, the other end of the passageway 11 defines a second opening 13 in the housing 10. In the first preferred embodiment the passageway 11 is of such length that when the finger 70 is placed in the first opening 12 the fingertips are allowed to protrude through the second opening 13 of the passageway 11. A longitudinal axis 14 of the passageway 11 is defined between the openings 12, 13 generally perpendicular to and centered with respect to the openings. The passageway 11 has an upper surface 15 and a lower surface 16 defined therein, the upper 15 and lower 16 surface being generally opposed to one another. A vertical axis 17 is defined between the upper 15 and lower 16 surfaces of the passageway 11 pervendicular to the longitudinal axis 14.

Figure 3:
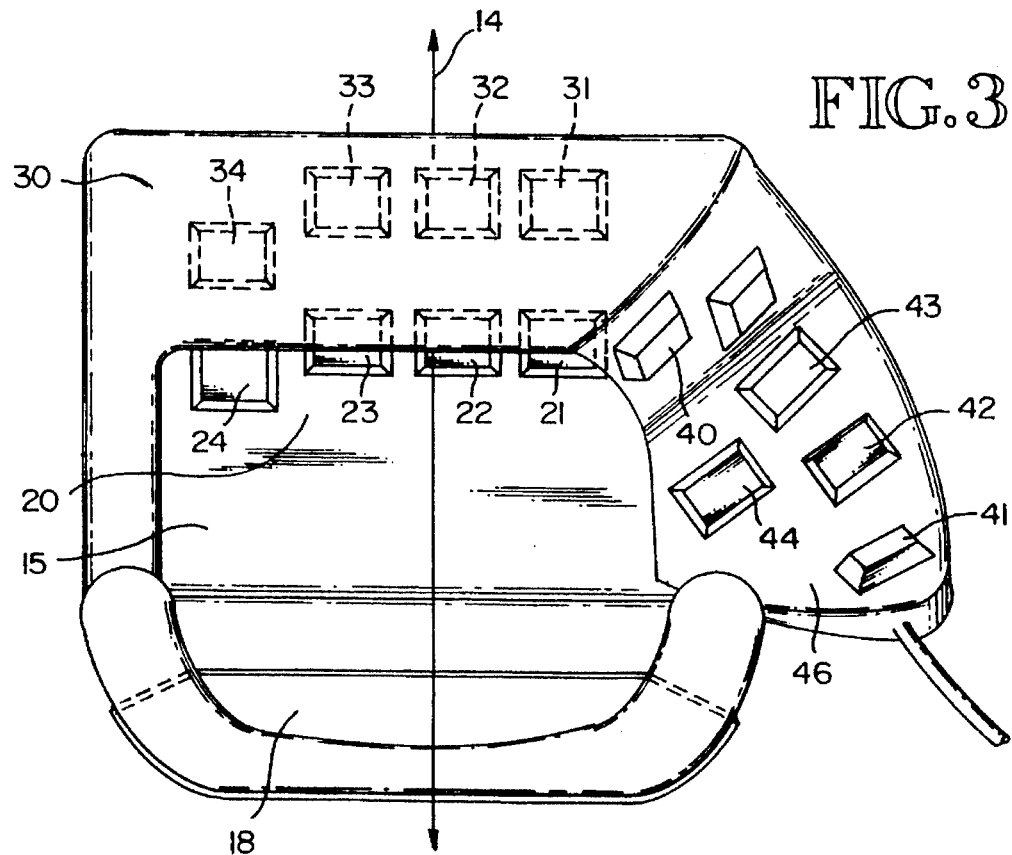
FIG. 3 shows a top plan view of the embodiment of FIG. 1.
Figure 4:
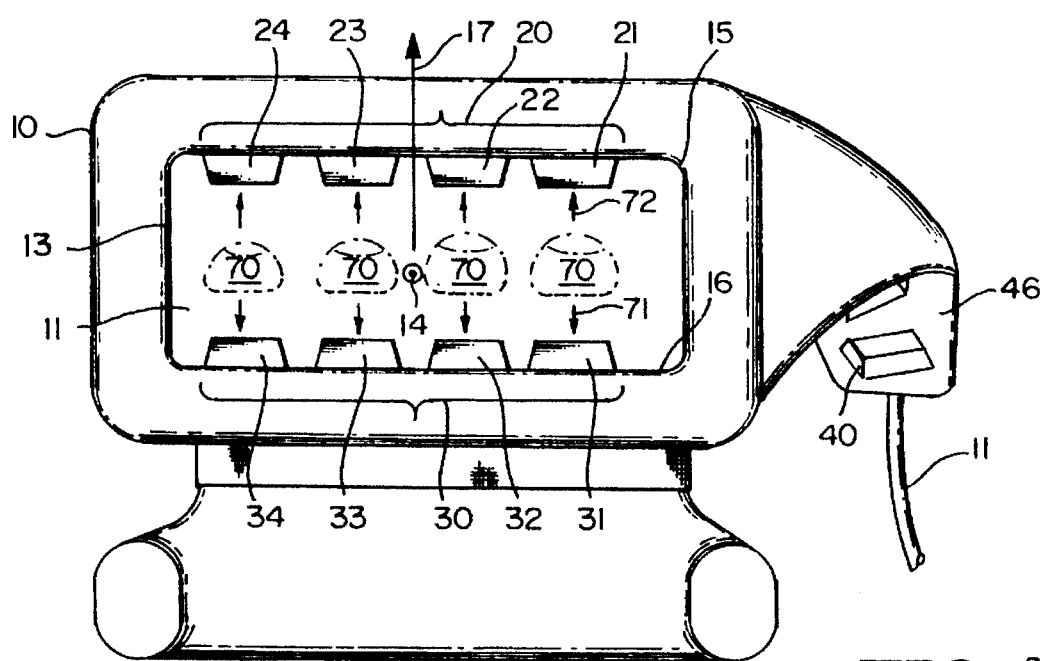
FIG. 4 shows a front plan view of the embodiment of FIG. 1.

Referring to FIGS. 3 and 4, the apparatus includes a pair of finger operated keypads 20, 30. Each finger operated keypad 20, 30 contains a number of keys 21–24, 31–34. Preferably, there are four keys 21–24, 31–34 on each of the finger operated keypads 20, 30, one for each finger 70 of the hand 60. The keys 21–24, 31–34 on each finger operated keypad 20, 30 are arranged in a single row. The keys each have a face defined thereon, for being operatively engaged by a finger 70 or thumb.

The first finger operated keypad 20 is mounted to the upper surface 15 of the passageway 11, the row of keys 21–24 being oriented laterally, across the passageway 11 with respect to the passageway's 11 longitudinal axis 14. The keys 21–24 are spaced, laterally apart from one another, such that, the face of each key 21–24 is in register with the finger 70 that is associated with that key 21–24, i.e. the finger that will operate the key 21–24. Additionally, the face of each of the keys 21–24 of the first finger operated keypad 20 are directed toward the lower surface 16 of the passageway 11.

The second finger operated keypad 30 is mounted to the lower surface 16 of the passageway 11, also oriented laterally across the passageway 11. The keys 31–34 are spaced laterally from one another, such that the face of each of the keys 31–34 is in register with the finger 70 that is associated, i.e. that will operate, that key 31–34. The faces of the keys 31–34 of the second finger operated keypad 30 being generally opposed vertically across the passageway 11 to the faces of the keys 21–24 of the first finger operated keypad 20.

The upper 15 and lower 16 surface of the passageway 11, and the first 20 and second finger 30 operated keypad are spaced vertically apart, such that the keys 31–34 of the second finger operated keypad 30 are proximate the ventral, or forehand, surfaces of the respective fingers 70, while the keys 21–24 of the first finger operated keypad 20 are proximate the dorsal, or backhand, surfaces of the respective fingers 70 when the fingers 70 are inserted into the keying position, between the opposed finger operated keypads 20, 30. The keys 21–24 of the first finger operated keypad 20 are activated by generally upward movements 71 of the respective fingers 70, the keys 31–34 of the second finger operated keypad 30 being activated by generally downward movements 72 of the respective fingers 70. The upward 71 and downward movements 72 being generated from the joint at which each finger joins the hand.

The keypads 20, 30 may be located at any point along the longitudinal axis 14 of the passageway 11, so that the keys 21–24, 31–34 may be activated with different portions of the respective fingers 70, i.e. the first, second or third phalanges or the respective joints between the phalanges, where the first phalanges is closest the hand, the third phalanges commonly referred to as the fingertip. Additionally, the first 20 and the second 30 finger operated keypads may be staggered along the longitudinal axis 14 of the passageway 11 from one another to gain the advantages of control and leverage offered by the different portions of the dorsal and ventral surfaces of the fingers 70. In one embodiment, the ventral surface of the third phalanges is proximate the keys 31–34 of the second finger operated keypad 30 and the dorsal surface of the joint between the first and the second phalanges is proximate the keys 21–24 of the first finger operated keypad 20.

With reference to FIG. 1–4, a first thumb operated keypad 40 is provided on the exterior of the housing 10. In the preferred embodiment, the first thumb operated keypad 40 is composed of four bi-state micro-switches 41–44. Alternatively, a single multi-directional switch may be substituted for the four switches 41–44 of the thumb operated keypad 40. The housing 10 has an exterior surface 46 defined thereon for mounting the thumb operated keypad 40. The thumb operated keys 41–44 are mounted to that surface such that the thumb lies in its natural rest position, the tip of the thumb being generally opposed to the tip of the index finger when the keyboard is mounted on the hand for operation. It is preferred that the thumb operated switches 41–44 be activated by the ventral surface of the second phalanges of the thumb. The housing 10 may be provided with a backward projecting extension 18 for engaging the top of the hand 60, thereby providing additional support for the housing 10. Additionally, a wrist strap may be provided, the wrist strap extending from the terminus of the backward projecting extension 18 for securing the housing 10 to the wrist of the user.

In the preferred embodiment, the housing 10 contains means for communicating the key outputs to external devices. Various methods of both wired and wireless communications would be suitable. In one embodiment, not shown, key outputs may be relayed to an external device using standard serial or parallel cabling 19. In another embodiment, an infrared transmitter may be employed, to transmit key output to an external infrared receiver associated with an external device. Likewise, a radio frequency transmitter may be employed in the keyboard, in conjunction with an external radio frequency receiver associated with the external device. These methods are conventional and well known so will not be described in further detail.

The switches and the communication device may receive power from an external source through standard cabling 19, or may receive power from an internally contained source such as a battery.

Figure 7:
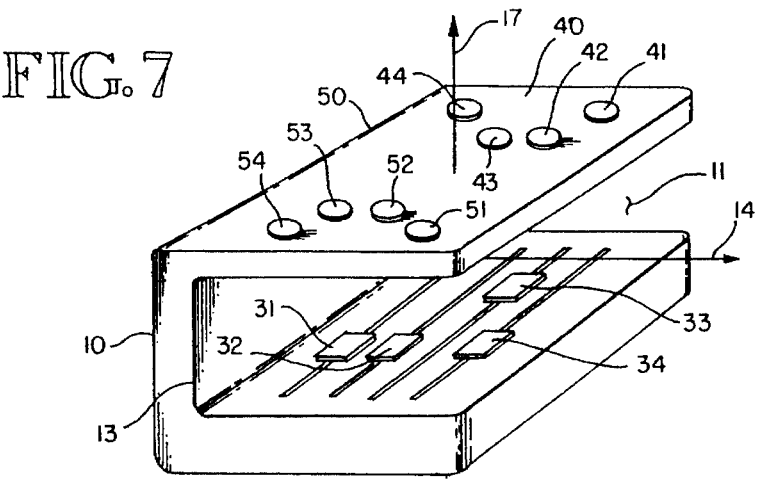
FIG. 7 shows an orthogonal view of a different version of the third preferred embodiment of the keyboard apparatus.

The housing 10 is provided with a template, FIG. 7, that the user may refer to for refreshing her memory, although the simplified mapping scheme makes this need unlikely.

Figure 5:
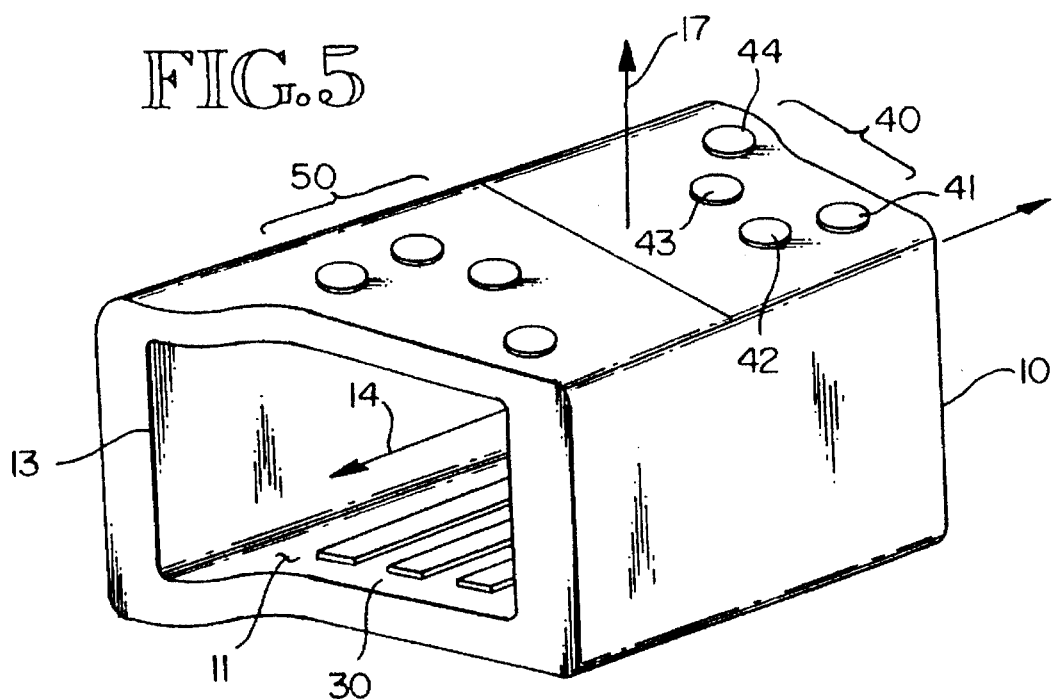
FIG. 5 shows an orthogonal view of a second preferred embodiment of the keyboard apparatus.
Figure 6:
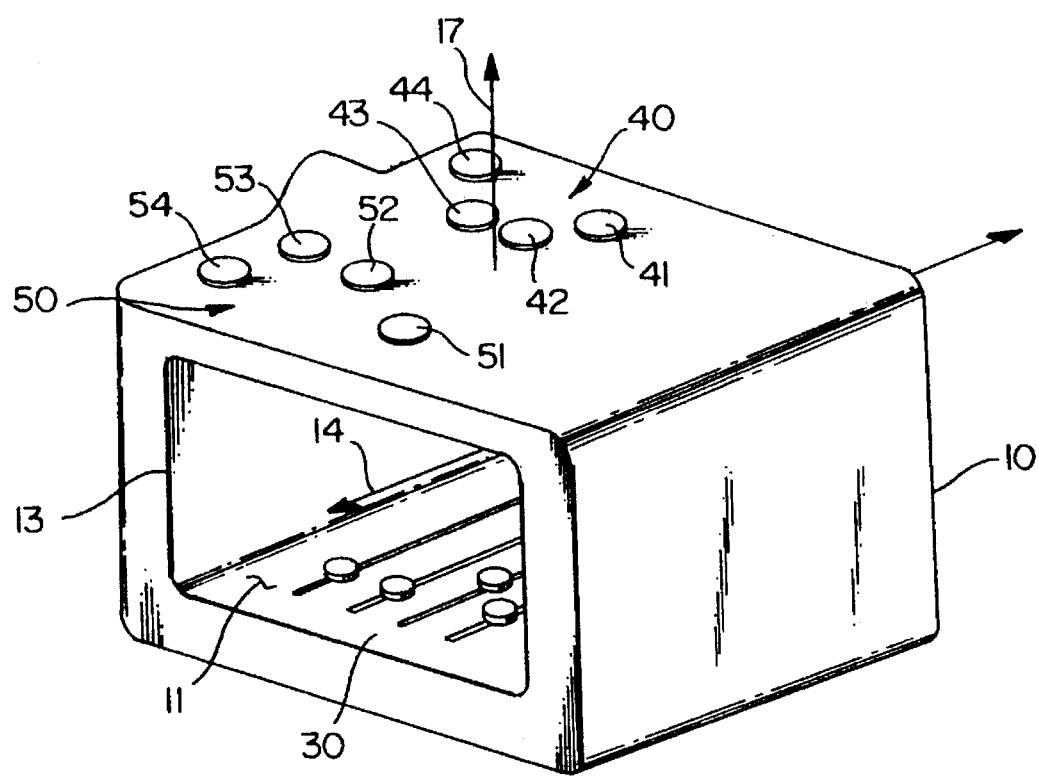
FIG. 6 shows an orthogonal view of a third preferred embodiment of the keyboard apparatus.

With reference respectively to FIGS. 5 and 6–7, a second and third preferred embodiment comprises an ambidextrous version of the above invention. In these versions, the passageway 11 is open at both ends 12, 13, for respectively receiving the fingers 70 of the right and left hands 60. These embodiments are intended to be operated by a single hand 70, the user able to switch operating hands 70 at any time. A pair of opposed finger operated keypads 20, 30 are mounted laterally, across the passageway 11, in the upper 15 and lower 16 surfaces of the passageway 11, in spaced apart relation for receiving the fingers 70 of the user therebetween.

With further reference to FIGS. 5–7, a pair of thumb operated keypads 40, 50, are located on the exterior of the housing 10, each proximate an opening 12, 13. Again, the thumb operated keypads 40, 50 are mounted such that the thumb lies in its natural rest position, the tip of the thumb being generally opposed to the tip of the index finger when the keyboard is carried on the hand. The thumb operated keypads 40, 50 are laid out in mirror image to one another, projected across a line of reflection centered between the two openings 12, 13, that is generally parallel to the planes defined by those openings 12, 13.

With reference to FIG. 5, in the second preferred embodiment, the keys 21–24, 31–34 of the opposed finger operated keypads 20, 30 are centered between the two openings 12, 13 of the passageway 11. The keys 21–24, 31–34 are elongated, along the longitudinal axis 14 of the passageway 11, extending out, from the centerline, toward each opening 12, 13 of the passageway 11. In this embodiment, each key 21–24, 31–34 is of a sufficient length so as to allow its operational engagement by either the fingers 70 of the right or left hands 60, as they are inserted in the respective openings 12, 13 of the passageway 11. This permits a single set of two opposed finger operated keypads 20, 30 to be used in a device that permits keying by alternatively, the fingers 70 of the right and left hands 60.

With reference to FIGS. 6 and 7, in the third preferred embodiment of the ambidextrous keyboard, the keys 21–24, 31–34 of the opposed finger operated keypads 20, 30 are mounted for sliding movement along the longitudinal axis 14 of the passageway 11. This allows the position of the keys 21–24, 31–34 to be adjusted between one opening 12 of the passageway 11 and the other opening 13, so that the keys 21–24, 31–34 may be located proximate the appropriate opening 12, 13 dependent on which hand 60 will be used for keying. Again, this permits a single set of two opposed finger operated keypads 20, 30 to handle keying by the fingers 70 of either the right or the left hands 60. As may be observed in FIG. 7, the passageway 11 need only have an upper 15 and a lower 16 surface and some structure to fix these surfaces 15, 16 in relation to one another.

In any embodiment, individual keys may be substituted in place of either the finger 20, 30 or thumb 40, 50 operated keypads.

While in the preferred embodiment the keys 21–24, 31–34, 41–44, 51–54 are conventional micro-switches, any type of switching mechanism may be employed. For example, touch sensitive pads may be substituted, or a multidirectional switch may be used. The use of these switch mechanisms in keyboards is well known and conventional, and will therefore not be explained further.

Figure 8:
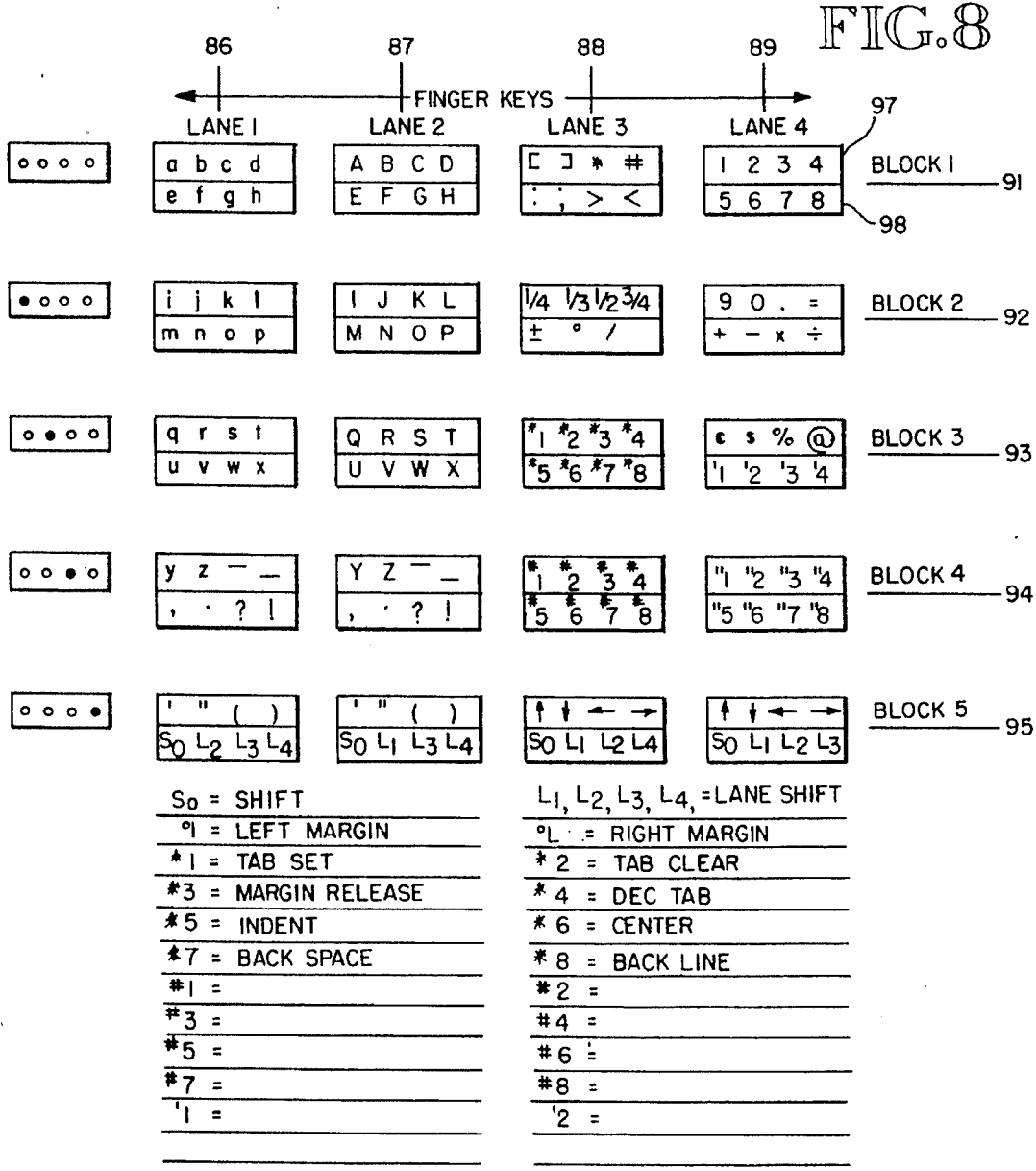
FIG. 8 shows the preferred keyboard mapping layout.

With reference to FIG. 8, the output dataset 80 is composed of all the characters, controls, and functions typically involved in computer operation and word processing. The outputs in this dataset 80 are grouped into lanes 85, each lane 85 consisting of task related characters, controls and functions. This permits the number of keys to be minimized without requiring excessive lanes switching by the user. The preferred embodiment divides the characters, controls and functions amongst four lanes 86–89, this being a convenient number to group the outputs into, given the number of thumb 41–44 and finger operated keys 21–24, 31–34 of the preferred embodiment. Other groups would of course be possible.

The outputs in each lane 86–89 are next divided in blocks 90. There are as many blocks 90 in a lane 85 as there are possible states generated by the thumb operated keys 41–44. In the first preferred embodiment, there are four thumb activated keys 41–44, which, when added to the neutral state, results in a total of five states. The preferred embodiment therefore has five blocks 91–95 for each lane of inputs.

Within each block 90, there are as many inputs as there are finger operated keys 21–24, 31–34. Like the finger operated keys 21–24, 31–34, the inputs within a block 90 are divided into rows 96. The number of rows 96 being equal to the number of rows of finger operated keys 21–24, 31–34, each finger operated keypad 20, 30 representing a row 97, 98 in the preferred embodiments. This representation of inputs, corresponds to the layout of the finger operated keypads 20, 30, making the mapping of outputs to thumb 41–44, 51–54 and finger operated keys 21–24, 31–34 more intuitive, and therefore easier to remember and recall.

To operate the keyboard, the user initially chooses a lane 85. The same block 90 in each of the lanes 85 is used for lane switching. An appropriate number of finger operated keys 21–24, 31–34 within that block 90 are assigned the lane switching function. In the preferred embodiment, three finger operated keys 32–34 of the second finger operated keypad 30 are assigned to switching between the four lanes 86–89. These keys 32–34 are the last three inputs of the bottom row 98, in the fifth block 95 of every lane 86–89. This corresponds to activating the fourth thumb switch 44, 54 of either the first 40 or the second 50 thumb operated keypad along with a downward movement 72 of either the first, second or third fingers 70, the fingers being defined medially to laterally, the first finger commonly known as the index finger, the third finger commonly referred to the ring finger.

The lane switching keys 32–34 are reconfigured automatically, so lane switching is relative to the current lane. That is, if the user is: i) in the first lane 86, the three keys 32–34 will switch to the second 87, third 88 and fourth 89 lanes respectively; ii) in the second lane 87, the first of the three keys 32 will switch to lane one 86, the second 33 and third 34 to lanes three 88 and four 89 respectively; iii) in the third lane 88, the first two of the three keys 32, 33 will switch to the first 86 and second 87 lanes respectively, the fourth key 34 switching to the fourth lane 89; and finally, iv) in the fourth lane 89, the three keys 32–34 will switch between the first 86, second 87, and third 88 lanes respectively.

Once a lane of task associated characters, controls and functions has been entered the user may choose to stay in the first block by failing to activate any of the thumb operated keys 41–44, or may enter the second through fifth blocks 92–95 by activating the first through fourth keys 41–44, 51–54 of either the first or the second thumb operated keys 40, 50, respectively.

Once a block 90 is chosen, the user need only select the desired output character, control or function. This is accomplished by small upward 71 or downward movements 72 of the fingers, to operatively engage the keys 21–24, 31–34 of the respective first and second finger operated keypads 20, 30.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principals of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims which follow.

I claim:

1. A keyboard apparatus mountable on a hand of a user, operable by at least three digits of the hand, the digits including at least two fingers and a thumb, each finger having a dorsal surface and a ventral surface, a first and second phalanges, the keyboard apparatus comprising:

a housing having an opening formed therein for receiving the fingers and a portion of the hand of the user;

a first finger operated keypad mounted in the opening and having at least two keys mounted therein, each registerable with an associated operating finger;

a second finger operated keypad mounted in the opening and having at least two keys mounted therein, each registerable with an associated operating finger, the keys of the second finger operated keypad being spaced vertically from and longitudinally closer to the opening than the respective keys of the first finger operated keypad; and a thumb operated keypad mounted on the exterior of the housing.

2. The keyboard apparatus of claim 1 wherein the second finger operated keypad is longitudinally spaced with respect to the first finger operated keypad such that the keys of the first finger operated keypad are engagable by the ventral surface of the first joint and the keys of the second finger operated keypad are engagable by the dorsal surface of third phalanges of the respective operating fingers.

3. A keyboard apparatus mountable on a hand of a user and operated by at least two fingers and a thumb of the hand, each of the fingers having a first phalange, a second phalange, a third phalange, a joint between the first and the second phalanges, a dorsal surface and a ventral surface, the keyboard apparatus comprising:

a housing having a passageway formed therethrough, a first opening in the housing defined at a first end of the passageway and a second opening in the housing defined at a second end of the passageway, the first and the second openings for receiving the fingers of the hand of the user, the housing defining a top surface and a bottom surface of the passageway therein, the bottom surface in generally opposed, spaced relation from the top surface;

a first finger operated keypad mounted on the bottom surface of the passageway, the first finger operated keypad having at least two keys each engagable by the ventral surface of the associated third phalanges, and spaced laterally across the bottom surface of the passageway with respect to a longitudinal axis passing through the first and second openings of the passageway; and a second finger operated keypad mounted in the top surface of the passageway, the second finger operated keypad having at least two keys each engagable by the dorsal surface of the associated joint and spaced laterally across the top surface of the passageway with respect to the longitudinal axis of the passageway, the keys of the second finger operated keypad being spaced vertically from and longitudinally closer to the first opening than the respective keys of the first finger operated keypad.

4. The keyboard apparatus of claim 3 wherein the housing has an exterior surface and wherein a first thumb operated keypad is mounted on the exterior surface.

5. The keyboard apparatus of claim 4 wherein the first and second finger operated keypads each include four keys.

6. The keyboard apparatus of claim 5 wherein the second finger operated keypad is spaced from the first finger operated keypad a predetermined distance along the longitudinal axis of the passageway such that the keys of the first finger operated keypad are proximate the joint and the keys of the second finger operated keypad are proximate the third phalanges of the respective fingers.

7. A method of keying with a single hand, employing at least two fingers and a thumb, on a keyboard having a first plurality of finger operated keys and a second plurality of finger operated keys in opposed spaced relation to the first plurality of finger operated keys, and at least one plurality of thumb operated keys, from a dataset containing a plurality of character and function outputs greater than the total number of the keys on the keyboard, the dataset arranged into at least a first lane and a second lane, the first lane containing a first plurality of task related outputs, the second lane containing a second plurality of task related outputs, the first and the second plurality of outputs of the respective lanes divided into at least a first block and a second block, there being one block more than the number of the thumb operated keys, each of the blocks containing the same number of the outputs as there are total number of the finger operated keys, and where each of the blocks of outputs is divided into at least two rows, the number of rows being equal to the number of keys intended to be operated by one of the fingers, each row containing a number of the outputs equal to the number of the fingers intended to be used, the keying method comprising the steps of:

activating the thumb operated keys to select the block desired and simultaneously activating one of the finger operated keys for choosing the lane of output desired; and activating the thumb operated keys to select the block desired and simultaneously activating one of the finger operated keys for selecting the output desired.

8. The method of keying of claim 7 wherein the step of activating the thumb activated keys comprises the steps of operatively disengaging all of the thumb operated keys to select the first block; and operatively engaging a first thumb operated key with the thumb to select the second block.

9. A method of keying with four fingers and a thumb of a single hand, on a keyboard having a first set of four finger operated keys and a second set of four finger operated keys in opposed spaced relation to the first set of finger operated keys, and at least one set of four thumb operated keys, from a dataset containing a plurality of character and function outputs greater than the total number of the keys on the keyboard, the dataset arranged into four lanes of task related outputs, the respective lanes divided into five blocks, each of the blocks of outputs divided into two rows, the keying method comprising the steps of:

activating the thumb operated keys to select the block desired and simultaneously activating one of the finger operated keys for choosing the lane of output desired; and activating the thumb operated keys to select the block desired and simultaneously activating one of the finger operated keys for selecting the output desired.

10. The method of keying of claim 9 wherein the step of activating the thumb activated keys to select the block desired comprises the steps of operatively disengaging all of the thumb operated keys to select the first block;

operatively engaging a first thumb operated key with the thumb to select the second block;

operatively engaging a second thumb operated key with the thumb to select the third block;

operatively engaging a third thumb operated key with the thumb to select the fourth block; and operatively engaging a fourth thumb operated key with the thumb to select the fifth block.

11. The method of keying of claim 10 wherein the step of activating the finger activated keys comprises the steps of operatively engaging the key desired in the first set of finger operated keys by first lifting theand the lowering the appropriate finger; and operatively engaging the key desired in the second set of finger operated keys by first lowering and then lifting the appropriate finger.

12. The method of keying of claim 11 wherein the step of activating the thumb operated keys to select the block desired consists of the step of operatively engaging the fourth thumb operated key with the thumb; and the step of simultaneously activating one of the finger operated keys for choosing the lane of output desired comprises the steps of operatively engaging the second key of the second set of finger operated keys by first lowering the appropriate finger and then lifting the finger to move to the second lane from the first lane, and to move to the first lanes from the second, third and fourth lanes;

operatively engaging the third key of the second set of finger operated keys by first lowering the appropriate finger and then lifting the finger to move to the third lane from the first and second lanes, and to move to the second lane from the third and fourth lanes;

operatively engaging the fourth key of the second set of finger operated keys by first lowering the appropriate finger and then lifting the finger to move to the fourth lane from the first, second and third lanes, and to move to the third land from the fourth lane.

13. A keyboard apparatus for being carried on a hand of a user and operated by at least two fingers and a thumb of the hand on which they keyboard is carried, each of the fingers having a first phalange, a second phalange, a third phalange, a joint between the first and the second phalanges, a dorsal surface and a ventral surface, the keyboard apparatus comprising:

a housing having a passageway formed therethrough, a first opening in the housing defined at a first end of the passageway and a second opening in the housing defined at a second end of the passageway, the first and the second openings for receiving the fingers of the hand of the user, the housing defining a top surface and a bottom surface of the passageway therein, the bottom surface in generally opposed, spaced relation from the top surface and wherein the housing has a plane of symmetry that is generally perpendicular to the longitudinal axis of the passageway and equidistant along the longitudinal axis from the first opening and the second opening;

at least one finger operated keypad mounted on a surface of the passageway, the finger operated keypad having at least two keys, the keys spaced laterally across the surface of the passageway with respect to a longitudinal axis passing through the first and second openings of the passageway;

a first thumb operated keypad mounted on the exterior of the housing;

a second thumb operated keypad mounted on the exterior of the housing, the keys of the second thumb operated keypad arranged as a mirror image of the keys of the first thumb operated keypad projected across the plans of symmetry.

14. The keyboard apparatus of claim 13 wherein the keys of at least one of the finger operated keypads has a first end proximate the first opening and a second end proximate the second opening.

15. The keyboard apparatus of claim 13 wherein the keys of at least one of the finger operated keypads are slidable mounted for movement in the longitudinal direction in the passageway between a first position proximate the first opening and a second position proximate the second opening.

* * * * *